United States Patent [19]

Heuscher

[11] 4,305,127

[45] Dec. 8, 1981

[54] PROJECTION COMPLETION METHOD OF PARTIAL AREA SCAN

[75] Inventor: Dominic J. Heuscher, Aurora, Ohio

[73] Assignee: Technicare Corporation, Solon, Ohio

[21] Appl. No.: 99,067

[22] Filed: Nov. 29, 1979

[51] Int. Cl.³ ............................................. G01N 23/00
[52] U.S. Cl. .................................. 364/414; 250/445 T
[58] Field of Search .............................. 364/414, 577; 250/445 T

[56] References Cited

U.S. PATENT DOCUMENTS 4,136,388 1/1979 Lindquist ............................ 364/577
4,189,775 2/1980 Inouye et al. ...................... 364/414

OTHER PUBLICATIONS

Lewitt, "Processing of Incomplete Measurement Data in Computed Tomography", Med. Image Proc. Group Tech. Rep. MIPG22, Feb. 1979, Comp. Sci. Dept-SUNY.

Nelcioclu et al., "Limited Field of View Reconstruction in Computerized Tomography", Dept. of Rad. Sci., Univ. of Calif., IEEE Trans. on Nuc. Sci. vol. NS-26, No. 1, Feb. 1979.

Ethier et al., "Development of High Resolution Computed Tomography of the Spinal Cord", Dept. of Rad., Montreal Neur. Hosp., Jnl. of Comp. Assis. Tomography, vol. 3, #4, Aug. 1979.

Lewitt et al., "Image Reconstruction from Projections: III: Projection Completion Methods (Theory)", EE Dept. Univ. of Canterbury, Optik 50 (1978) No. 3, pp. 189-204.

Lewitt et al., "Image Reconstruction from Projections: IV: Projection Completion Methods (Computational Ex.)", EE Dept., Univ. of Canterbury, Optik 50 (1978) #4, pp. 269-278.

Oppenheim, "More Accurate Algorithms for Iterative 3-D Reconstruction", Univ. of Chicago, IEEE Trans. on Nucl. Sci., vol. NS-21, Jun. 1974.

Burton, "Computed Tomographic Scanning and the Lumbar Spine": Part 1: Economic and Historical Review, Spine, vol. 4, No. 4, Jul./Aug. 1979, pp. 353-355.

*Primary Examiner*—Errol A. Krass
*Attorney, Agent, or Firm*—Michael A. Kaufman

[57] ABSTRACT

A method of preprocessing incomplete or truncated projections obtained from high resolution CT scanning of a small scan circle corresponding to a limited region of interest within the scanned object. An air calibration is performed to obtain a set of air values. The intensity values obtained during the partial area scan are subtracted from the air values to convert the intensity values to attenuation values. The approximate slope at either end of the truncated projection is then calculated. Based on the attenuation values and the slope the necessary extrapolation of the truncated projection is performed to complete the projection. No measurements, ionizing or otherwise, are required from the region outside of the small scan circle.

The completed projection is ready for conventional reconstruction techniques involving convolution and back projection.

6 Claims, 4 Drawing Figures

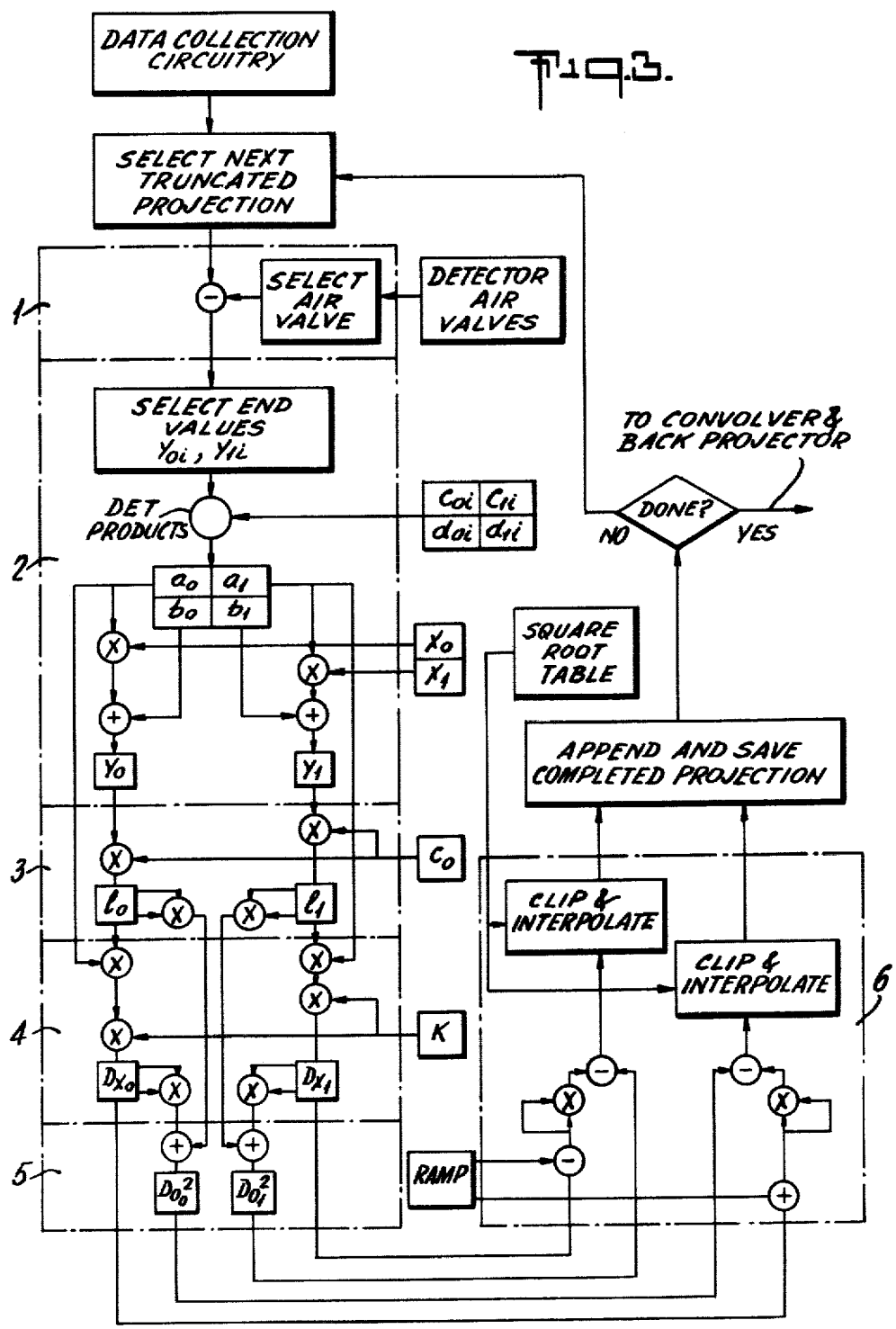

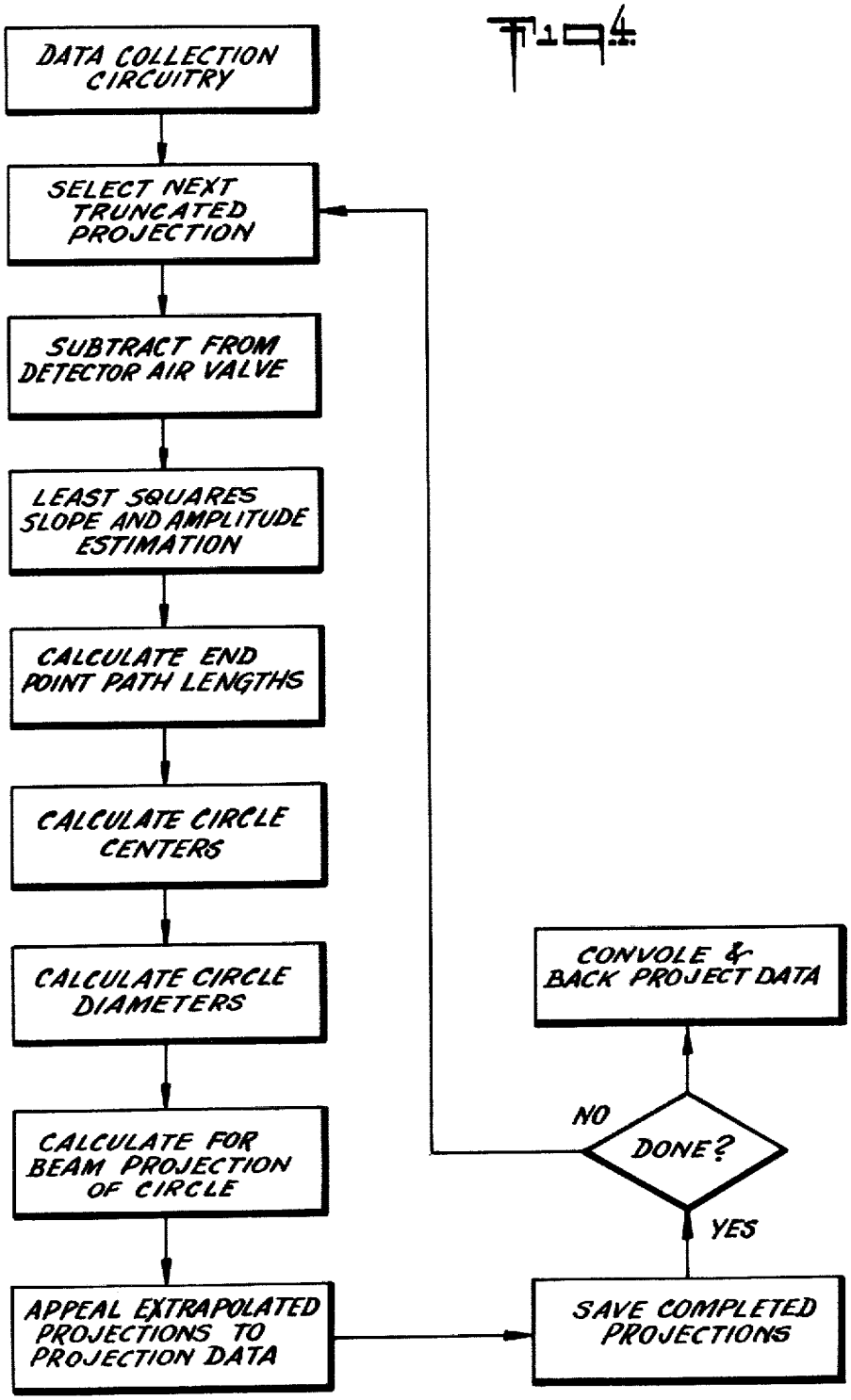

PROJECTION COMPLETION METHOD OF PARTIAL AREA SCAN

TECHNICAL FIELD

This invention relates to a method of preprocessing incomplete or truncated projections obtained from scanning a small area of interest within a body to permit the truncated projections to be reconstructed using conventional techniques involving back projection and convolution.

BACKGROUND ART

In conventional computed tomography (CT) planar sections of a body are diagnosed by irradiating a substantial area of such planar sections by a source of penetrating radiation, detecting the attenuated beam passing through the patient, and processing the data accumulated by the detector. The data processing techniques used in conventional CT require the entire planar section to be scanned in order to reconstruct any part of it by traditional techniques utilizing back projection and convolution. Very often, however, there is only a relatively small area of interest in any particular cross section of the body, for example, in examining the spine. The advantage of using a small scan circle in such cases is the reduction of radiation dosage to the patient since all of the radiation beams pass through the smaller scan circle and better optical resolution in the area of interest. The latter is true because typically if a large scan circle is used to image a whole patient section, the resolution in the area of interest will be less than the full resolution capability of the scanner.

There are known techniques for preprocessing an incomplete projection obtained from a small scan circle which permit conventional CT algorithms to be applied to reconstruct images of the limited region of interest.

One projection completion method has been suggested by R. M. Lewitt, "Processing of Incomplete Measurement Data In Computed Tomography", Technical Report No. MIPG22, State University of New York at Buffalo, February, 1979, which involves the use of known boundaries of the object being scanned. This technique obtains a projection of a circle by performing a curve fit to the end of the truncated projection and to the previously determined baseline location of the edge of the object. This technique requires a method for measuring and digitizing the boundary locations of the edge of the object (outside the scan circle) as the scan is being performed. Though non-ionizing methods exist for defining the boundary, the method is dependent upon making measurements outside the limited region of interest defined by the small scan circle and hence involves additional expense and complexity.

Another projection completion method is that of coarse/fine sampling of the projections as suggested by O. Nalcioglu et al. in "Limited Field Of View Reconstruction In Computerized Tomography" NS-26 IEEE Transactions on Nuclear Science 546-51, 1979, and reported by R. Ethier of the Montreal Neurological Hospital, at 3 Journal of Computer Assisted Tomography 433-38, 1979. This technique involves performing high density sampling of the limited area of interest and coarse sampling of the surrounding tissue region to obtain the profile necessary to complete the projection. Presumably, a filter is inserted at the X-ray source to lower the dosage to the surrounding tissue. This requires a modification to the hardware configuration that performs the sampling process. Also, calibration must be done to obtain the profiles necessary to compensate for the attenuating filter at the source. In contrast, the preferred embodiment requires minimum modifications to a scanner.

DISCLOSURE OF THE INVENTION

Applicant has discovered a projection completion method of a truncated projection obtained from a partial area scan which requires no measurements of any kind wholly external to the small scan circle. The present method involves an extrapolation from truncated projection data to estimate a full projection. This permits correct density values to be reconstructed. Furthermore, no radiation exposure is required outside the scan circle. Because the scan circle is sized to only the area of interest, maximum scanner resolution is achieved.

The present method permits high resolution imaging of a limited region of interest with simplicity and minimum dose to the patient. The simplicity arises from the elimination of complex x-ray filters, as in a coarse/fine technique, and not having to determine the boundary of the object. The simplicity also allows these corrections to be made without increasing reconstruction time. Since no radiation is required outside the area of interest, the result is minimum dose to the patient.

In a preferred embodiment, the method of preprocessing truncated intensity projection values in preparation for reconstruction of the limited region of interest comprises performing a calibration to obtain a set of reference values, converting the truncated intensity projection values to truncated attenuation projection values by use of the reference values, estimating the slope at each end of the truncated attenuation projection, and extrapolating the truncated projection from the attenuation and slope values to complete the projection.

BRIEF DESCRIPTION OF THE DRAWINGS

FIG. 3 is a flow diagram of the projection completion method according to the present invention.

FIG. 4 is a schematic block diagram analog of FIG. 3 illustrating the method in machine implemented form.

BEST MODE OF CARRYING OUT THE INVENTION

Figure 1:
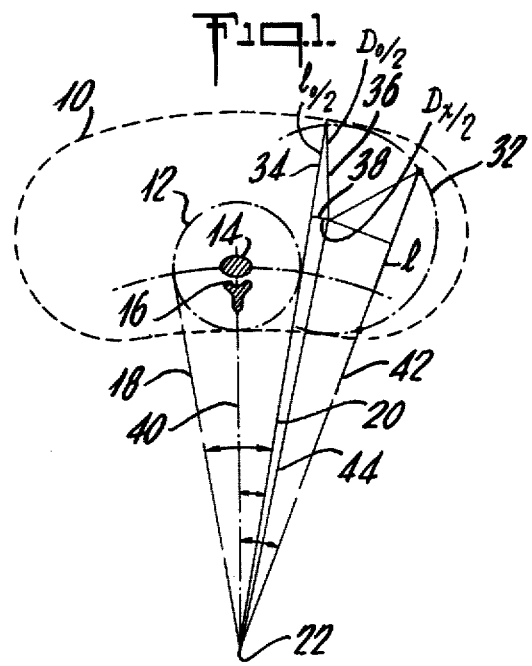
FIG. 1 illustrates the estimation of a circle for completing one end of a truncated projection.
Figure 2:
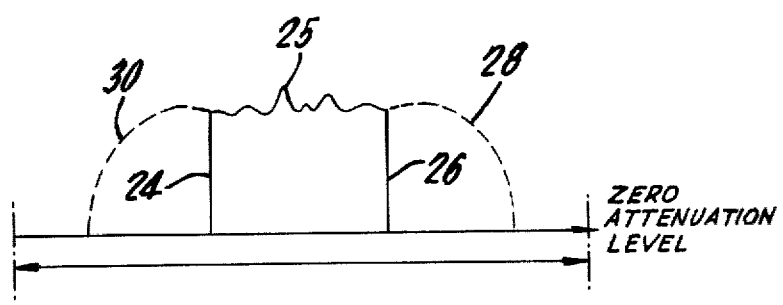
FIG. 2 illustrates graphically a truncated projection from the partial area scan illustrated in FIG. 1. The phantom lines at either end of the representation of the truncated projection represent the portions of the projection that are completed by the inventive method.

The method of projection completion is geometrically illustrated with the aid of FIGS. 1 and 2. FIG. 1 illustrates a cross section 10 of a body to be scanned. The area of diagnostic significance is fully contained within the region defined by small scan circle 12. The small scan circle 12 includes a section of the patient's spinal column showing disc 14 and verterbra 16. In order to achieve improved resolution of the limited region of interest, the angle of the beam of each radiation source is collimated or reduced to angle $\theta$ to approximate the diameter of small scan circle 12. Thus, the angle over which the incomplete or truncated projection extends is defined by the rays 18 and 20 which converge at a sample detector location 22. The collimation results in a truncated projection as diagrammatically represented in FIG. 2. Lines 24 and 26 in FIG. 2 represent the bounds of small scan circle 12 as depicted in the truncated projection 25. The phantom portions 28, 30 of the projection corresponds to the region of cross section 10 that lies wholly outside of the small scan circle 12. The phantom portions 28, 30 of the projection of FIG. 2 must be approximated to permit the truncated projection 25 to be reconstructed to form a suitable image. To approximate either end 28, 30 of the truncated projection, a circle approximating either side of the cross section 10 must be estimated. In order to estimate a circle two parameters are needed.

FIG. 1 illustrates the estimation of a circle 32 for completing one end 28 of the truncated projection. Segment 34 represents one-half of a pathlength $l_o$ as measured at the end of a projection. Radius 36 represents one-half of diameter $D_o$ of the estimated circle 32. $D_x$ illustrated by line 38 represents twice the distance between the center of the estimated circle 32 and the projection ray 20. Ray 18 also corresponds to the length of the detector radius. The angle $\alpha$ defines an angle between center ray 40 of the small scan circle 12 and of arbitrary pathlength 1 which intersects the estimated circle 32. Angle $\alpha_o$ defines an angle between the center ray 40 of the small scan circle 12 and the projection ray 20. Finally, angle $\alpha_\Delta$ defines an angle between the projection ray 20 and the center ray 44 of the estimated circle 32.

As stated above, to eliminate any unnecessary radiation dosage to the patient during a partial area scan, the source fan (not shown) is collimated to that size necessary to cover the scan circle. Thus, no air values exist as a reference to measure the attenuation through the object. Since typically techniques for reconstruction require such reference values, in the present method an air calibration is performed during the regular tune-up procedure. This step involves performing a single air scan with the collimator in place, then computing one air intensity value for each detector equal to the maximum value found in either wing of the projection data (each wing is first filtered over 30 points with a four point averaging filter). This set of air values is saved for subsequent use by the reconstruction algorithm as indicated by section 1, of the schematic diagram of FIG. 4. Since the average drift of the set of detectors is very low, this technique gives reproducible density values for scans over an extended period of time.

In operation, the intensity projection data is subtracted from the calibrated air values to obtain the appropriate attenuation values as indicated in block 1 of the flow diagram of FIG. 3. These truncated projections are then completed by using pathlength $l_o$ and least squares slope A at each end of the projection. These two parameters can be used to define two unique circles whose projections are used to complete the projection as illustrated in FIGS. 1 and 2. Assuming the attenuation at the edge of the projection to be primarily due to water, a constant conversion factor $C_o$ can be used to convert water pathlength $l_o$ from the corresponding attenuation $y_o$. The pathlength $l_o$ can also be written as a function of the radius 36 or diameter $D_o$ of the estimated circle 32 and the distance from the center of the circle whose value can be approximated by D sin ($\alpha$-$\alpha_o$-$\alpha_\Delta$).

$$l \approx 2[(D_o/2)^2 - D^2 \sin^2(\alpha - \alpha_o - \alpha_\Delta)]^{\frac{1}{2}} \quad (1)$$

Where: D = detector radius

Referring to FIG. 1, in the case of the pathlength $l_o$:

$$l_o \approx 2[(D_o/2)^2 - D^2 \sin^2 \alpha_\Delta]^{\frac{1}{2}} \quad (2)$$

Assuming the angles $\alpha$, $\alpha_o$ and $\alpha_\Delta$ to be small in magnitude we can rewrite (1) using the tangent of the respective angles:

$$l \approx [D_o^2 - 4D^2(\tan \alpha - \tan \alpha_o - \tan \alpha_\Delta)^2]^{\frac{1}{2}} \quad (3)$$

Since the tangent of the ray angle is simply the ray index divided by a constant M, we can rewrite (3) as a function of the index (x) for the projection data:

$$l \approx \left[ D_o^2 - 4D^2 \left( \frac{x - x_o - x_\Delta}{M} \right)^2 \right]^{\frac{1}{2}} \quad (4)$$

Where: M = The Ray Index to Tangent of Ray Angle Conversion Factor

For a scan circle 12, wherein $\alpha_o$ is half the angle encompassing the scan circle from a distance D, the detector radius, and N represents the number of equispaced rays along the diameter of circle 12, then $$M = \frac{N-1}{2} \cdot \cot \alpha_o$$

We can also rewrite (4) as:

$$l \approx [D_o^2 - \{K(x - x_o) + D_x\}^2]^{\frac{1}{2}} \quad (5)$$

Where:
K = 2D/M
DX = -2D $X_\Delta$/M
X = Ray Index
$X_o$ = Index for the end of the truncated projection
$X_\Delta$ = Index from the ray 44 through the center of the estimated circle to the ray 20 at the end of the projection.

By using the slope (A) at the end of the projection, obtained from a least squares estimation over the last 30 points, an alternative expression for DX is obtained involving known constants:

$$A = \frac{dy}{dx}\bigg|_{x_o} = \frac{1}{C_o} \frac{dl}{dx}\bigg|_{x_o} = -\frac{D_x K}{C_o(D_o^2 - D_x^2)^{\frac{1}{2}}}$$

since $l_o = (D_o^2 - D_x^2)^{\frac{1}{2}}$, $$D_x = -Al_o(C_o/K) \quad (6)$$

Where:
A = Estimated slope
$l_o = y_o C_o$ = pathlength at the end of the projection
$y_o$ = Attenuation value at the end of the projection
$C_o$ = conversion factor for water
K = 2D/M $D_o$ is simply obtained from $D_x$ and $l_o$:

$$D_o^2 = l_o^2 + D_x^2 \quad (7)$$

An expression for the attenuation (y) as a function of the ray index (x) can now be written:

$$y = (1/C_o)\{D_o^2 - [K(x - x_o) + D_x^2]\}^{\frac{1}{2}} \quad (8)$$

Diagram 3 outlines the steps taken in evaluating the above expression in order to complete the projection to 1024 points. If the number of rays N in the truncated projection is 511, then the number of extrapolated points for the two wings are 257 and 256. For cases in which all the values for the extrapolated points are non zero, the truncation effect beyond 257 points is considered to be negligible due to the distance from the region of interest. Since a 1024 point FFT is still performed, essentially no time has been added to the execution of the convolution task.

Referring now to FIG. 4, in section 1, the stored detector air values are used to convert the intensity data to attenuation data. In section 2, the stored least squares coefficients Coi, Cli, doi, dli, are used to form the dot products with the end values of either side of the truncated projection. The results give the slopes ao, al, and intercepts bo, bl. The index values for the first points of the extrapolated projections (stored constants Xo, Xl) are used to generate the corresponding attenuation values Yo, Yl. Section 3 then converts these values to the path lengths $l_o$, $l_1$. Using the stored constant K, the centers of the estimated circles are calculated in section 4 as Dxo and Dxl. The squares of the circle diameters are calculated in section 5 as $D\phi_o^2$ and $D\phi_1^2$. Combining the results of sections 4 and 5 with a stored array of index values (ramp function) and using a square root lookup table, the extrapolated projections are obtained in section 6. These are then appended to the truncated attenuation data to produce the completed projection. The completed projections are saved for conventional processing involving convolution and backprojection.

What is claimed is:

1. A method for examining a portion of a planar region of a patient such as a section of the spine by a CT scanner of the type having a scan circle defining an examination region, a rotating source of penetrating radiation movably mounted relative to said scan circle for subjecting the scan circle to radiation, radiation detection means having an array of detectors coplanar with the path of the source positioned to receive at least some of the radiation that has passed from said source and through the scan circle for producing signals indicative of the intensity of radiation impinging thereon, and processing means operatively connected with said detection means for reconstructing into a visual display said signals caused by radiation attenuation in the scan circle, the method comprising:

(a) calibrating said array of detectors to generate a reference value for each detector indicative of attenuation by air;

(b) emitting a divergent beam of radiation by said rotating source at an angle sufficiently large to encompass the portion of interest of the planar region of the patient and smaller than required for subjecting the entire scan circle to radiation, the common area within the angle of the beam at different positions of the rotating source defining a small scan circle corresponding to the portion of interest;

(c) acquiring a plurality of incomplete projections of said planar slice of the patient corresponding to a plurality of angular orientations of the source about said patient, each incomplete projection representing the irradiated portion of the object as defined by said small scan circle;

(d) completing each of said plurality of incomplete projections by:

(i) estimating the slope at both ends of said incomplete projection;

(ii) determining actual attenuation values for said incomplete projection by normalizing each detected intensity value by the corresponding detector reference value;

(iii) extrapolating thereby an elliptical curve at both ends of said incomplete projection from the corresponding estimated values of slope and calculated attenuation values; and (e) reconstructing said limited region of interest of the planar slice of said scanned patient from said plurality of completed projections.

2. A method according to claim 1 wherein said calibration step is performed by scanning the scan circle with no patient in the examination region.

3. A method according to claim 1 further comprising: collimating the divergent beam of radiation emitted by said rotating source of penetrating radiation.

4. A method according to claim 1 wherein the step of estimating the slope at each end of each incomplete projection comprises:

(a) selecting a plurality of attenuation values from said incomplete projection; and (b) performing a least squares estimation from said plurality of selected values.

5. A method according to claim 4 wherein the extrapolating step for each end of each incomplete projection comprises:

(a) defining a unique circle from said slope and actual attenuation values which estimates the region of the patient outside the small scan circle; and (b) completing said incomplete end of the projection by calculating the elliptical curve that said unique circle would project if irradiated.

6. A method according to claim 1 wherein the step of completing each of said plurality of incomplete projections further comprises:

assigning a uniform attenuation value to all regions of the patient falling outside of the small scan circle.

* * * * *